(12) United States Patent
Larsson

(10) Patent No.: US 7,975,055 B2
(45) Date of Patent: Jul. 5, 2011

(54) METHODS FOR DISCOVERING A PHONE-BASED WEB SERVER AND RELATED ELECTRONIC DEVICES AND COMPUTER PROGRAM PRODUCTS

(75) Inventor: Bo Larsson, Malmö (SE)

(73) Assignee: Sony Ericsson Mobile Communications AB, Lund (SE)

( * ) Notice: Subject to any disclaimer, the term of this patent is extended or adjusted under 35 U.S.C. 154(b) by 634 days.

(21) Appl. No.: 11/689,814

(22) Filed: Mar. 22, 2007

(65) Prior Publication Data
US 2008/0172474 A1 Jul. 17, 2008

Related U.S. Application Data

(60) Provisional application No. 60/880,557, filed on Jan. 16, 2007.

(51) Int. Cl.
*G06F 13/00* (2006.01)
(52) U.S. Cl. .......................... 709/227; 709/229; 709/203
(58) Field of Classification Search .................. 709/227, 709/228, 229, 225, 203; 726/2–7, 11, 12, 726/17
See application file for complete search history.

(56) References Cited

U.S. PATENT DOCUMENTS

| | | | |
|---|---|---|---|
| 7,359,373 B2 * | 4/2008 | Kuusinen et al. | 370/352 |
| 7,609,700 B1 * | 10/2009 | Ying et al. | 370/395.21 |
| 2004/0186883 A1 * | 9/2004 | Nyman et al. | 709/203 |
| 2005/0004968 A1 * | 1/2005 | Mononen et al. | 709/200 |
| 2005/0015499 A1 * | 1/2005 | Mayer | 709/228 |
| 2005/0083909 A1 * | 4/2005 | Kuusinen et al. | 370/352 |
| 2006/0136554 A1 * | 6/2006 | Rajaniemi et al. | 709/203 |
| 2008/0010676 A1 * | 1/2008 | Dosa Racz et al. | 726/11 |
| 2008/0098463 A1 * | 4/2008 | Wikman | 726/5 |
| 2008/0159276 A1 * | 7/2008 | Kuusinen et al. | 370/356 |
| 2010/0017521 A1 * | 1/2010 | Ying et al. | 709/227 |

FOREIGN PATENT DOCUMENTS
WO WO2004/083995 9/2004
WO WO2004/095159 11/2004

OTHER PUBLICATIONS

International Search Report and Written Opinion dated Sep. 17, 2007 for corresponding PCT application No. PCT/EP2007/055755.

* cited by examiner

*Primary Examiner* — Kenneth R Coulter
(74) *Attorney, Agent, or Firm* — Myers Bigel Sibley & Sajovec, P.A.

(57) ABSTRACT

An electronic device is operated by establishing a communication session between the electronic device and a requesting device using Session Initiation Protocol (SIP), providing an Internet Protocol (IP) address for the electronic device to the requesting device using the SIP, receiving a request addressed to the electronic device using the IP address from the requesting device, and conveying the Web service to the requesting device responsive to receiving the request.

19 Claims, 3 Drawing Sheets

METHODS FOR DISCOVERING A PHONE-BASED WEB SERVER AND RELATED ELECTRONIC DEVICES AND COMPUTER PROGRAM PRODUCTS

CROSS REFERENCE TO RELATED APPLICATION

This application claims the benefit of and priority to U.S. Provisional Patent Application No. 60/880,557, filed Jan. 16, 2007, the disclosure of which is hereby incorporated herein by reference as if set forth in its entirety.

BACKGROUND OF THE INVENTION

The present invention relates to communication networks, and, more particularly, to methods, electronic devices, communication networks, and computer program products for discovering a phone-based Web server.

The Internet is a decentralized network of computers that can communicate with one another via Internet Protocol (IP). The Internet includes the World Wide Web (WWW) service facility, which is a client/server-based facility that includes a large number of servers (computers connected to the Internet) on which Web pages or files reside, as well as clients (Web browsers), which interface users with the Web pages. The topology of the World Wide Web can be described as a network of networks, with providers of network services called Network Service Providers, or NSPs. Servers that provide application-layer services may be referred to as Application Service Providers (ASPs). Sometimes a single service provider provides both functions.

A Web server that resides on a mobile terminal, for example, may be used in a variety of ways. For example, a user may allow his/her friends and/or family to access the user's photo album or other media residing on the user's phone. A user may be able to create and host blogs without having to rely on third-party service providers. A user may be able to use the mobile terminal as a remote camera in either still or video mode. A user may be able to access the phonebook and/or address book on the mobile terminal and edit it remotely, for example, from a computer with a more convenient keyboard and display. Business colleagues may sectirely access each other's calendars to check availability and reserve meeting times without the need to access a corporate network. A user may be able to securely access a mobile terminal to check incoming messages even if the user has left the phone in a remote location.

Unfortunately, mobile terminals are typically not discoverable via their Internet Protocol (IP) addresses through the Domain Name System (DNS) because their IP addresses are private. Moreover, IP addresses for mobile terminals are often dynamic and registering IP addresses for mobile terminals may be impractical because of the sheer number of mobile terminals that are in service.

SUMMARY OF THE INVENTION

According to some embodiments of the present invention, an electronic device is operated by establishing a communication session between the electronic device and a requesting device using Session Initiation Protocol (SIP), providing an Internet Protocol (IP) address for the electronic device to the requesting device using the SIP, receiving a request addressed to the electronic device using the IP address from the requesting device, and conveying the Web service to the requesting device responsive to receiving the request.

In other embodiments, establishing the communication session includes establishing the communication session over an IP Multimedia Subsystem (IMS) network.

In still other embodiments, the method further includes registering a profile associated with the electronic device with a Home Subscriber Server (HSS) database in the IMS network, the profile including a SIP address for the electronic device for use in completing a SIP call from the requesting device to the electronic device.

In still other embodiments, the method further includes receiving a SIP invite message that includes a Session Description Protocol (SDP) portion that indicates a request to access the Web service during the communication session.

In still other embodiments, the SDP portion includes a media description field (m=) that contains a media subfield set to application and a format subfield (fmt) set to HyperText Transfer Protocol (HTTP).

In still other embodiments, the SDP portion further includes an attribute field (a=) that contains a Web server attribute to indicate that HTTP is used to access the Web service.

In still other embodiments, the electronic device is a mobile terminal.

In other embodiments a computer program product for operating an electronic device includes a computer readable storage medium having computer readable program code embodied therein. The computer readable program code includes computer readable program code configured to establish a communication session between the electronic device and a requesting device using Session Initiation Protocol (SIP), provide an Internet Protocol (IP) address for the electronic device to the requesting device using the SIP, receive a request addressed to the electronic device using the IP address from the requesting device, and convey the Web service to the requesting device responsive to receiving the request.

In further embodiments of the present invention, an electronic device includes a communication module that is configured to establish a communication session between the electronic device and a requesting device using Session Initiation Protocol (SIP) and to provide an Internet Protocol (IP) address for the electronic device to the requesting device using the SIP, and a Web server that is configured to receive a request addressed to the electronic device using the IP address from the requesting device and to convey the Web service to the requesting device responsive to receiving the request.

In still further embodiments, the communication module is further configured to establish the communication session over an IP Multimedia Subsystem (IMS) network.

In still further embodiments, the communication module is further configured to register a profile associated with the electronic device with a Home Subscriber Server (HSS) database in the IMS network, the profile including a SIP address for the electronic device for use in completing a SIP call from the requesting device to the electronic device.

In still further embodiments, the communication module is further configured to receive a SIP invite message that includes a Session Description Protocol (SDP) portion that indicates a request to access the Web service during the communication session.

In still further embodiments, the SDP portion includes a media description field (m=) that contains a media subfield set to application and a format subfield (fmt) set to HyperText Transfer Protocol (HTTP).

In still further embodiments, the SDP portion further includes an attribute field (a=) that contains a Web server attribute to indicate that HTTP is used to access the Web service.

In still further embodiments, the electronic device is a mobile terminal.

In other embodiments of the present invention, a communication network is operated by using Session Initiation Protocol (SIP) to notify a first electronic device that a second electronic device, which does not have a public Internet Protocol (IP) address, has a Web server.

In still other embodiments, using the SIP to notify the first electronic device that the second electronic device has the Web server includes using SIP to provide an IP address for the second electronic device to the first electronic device.

In still other embodiments, the method further includes sending a request for a Web service from the first electronic device to the Web server at the second electronic device using the IP address of the second electronic device, and conveying the Web service from the second electronic device to the first electronic device responsive to receive the request at the second electronic device.

In still other embodiments, the communication network is an IP Multimedia Subsystem (IMS) network.

In still other embodiments, the method further includes registering a profile associated with the second electronic device with a Home Subscriber Server (HSS) database in the IMS network, the profile including a SIP address for the second electronic device for use in completing a SIP call from the first electronic device to the second electronic device.

In still other embodiments, the second electronic device is a mobile terminal.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
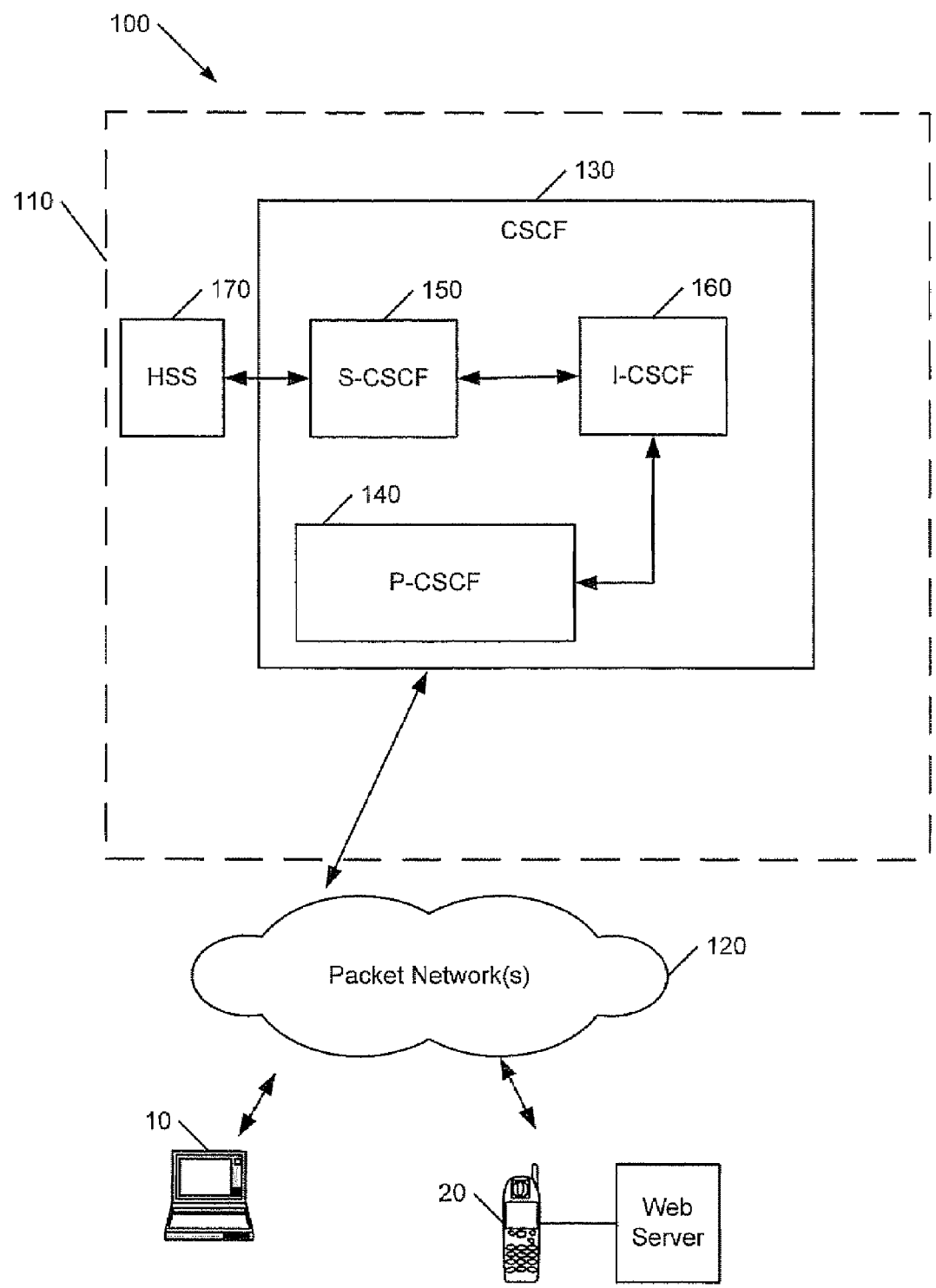
FIG. 1 is a block diagram that illustrates an Internet Protocol (IP) Multimedia Subsystem (IMS) network architecture, in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, electronic devices, and/or computer program products. Accordingly, the present invention may be embodied in hardware and/or in software (including firmware, resident software, micro-code, etc.). Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following a portable computer diskette, a random access memory (RAM), a read-only memory (ROM), an erasable programmable read-only memory (EPROM or Flash memory), and a compact disc read-only memory (CD-ROM).

As used herein, the term "mobile terminal" may include a satellite or cellular radiotelephone with or without a multi-line display; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver. Mobile terminals may also be referred to as "pervasive computing" devices.

For purposes of illustration, embodiments of the present invention are described herein in the context of a mobile terminal. It will be understood, however, that the present invention is not limited to such embodiments and may be embodied generally as an electronic device that includes a Web server thereon.

As used herein, the term "IP terminal or device" refers to a terminal or device that may communicate using the Session Initiation Protocol (SIP). It will be understood that an IP terminal or device may also refer to devices that communicate using SIP via a media gateway, which translates communications, for example, between an IP network and another network, such as the public switched telephone network or a circuit switched wireless network. As used herein, the term "message" means a unit of information and/or a block of data that may be transmitted electronically as a whole or via segments from one device to another. Accordingly, as used herein, the term "message" may encompass such terms of art as "frame" and/or "packet," which may also be used to refer to a unit of transmission.

Some embodiments of the present invention stem from a realization that although a mobile terminal's Internet Protocol (IP) address is typically not publicly available, a mobile terminal may nevertheless host a Web server thereon and the Web server may be discoverable by other devices through use of SIP over, for example, an Internet Protocol (IP) Multimedia Subsystem (IMS) network.

IMS is a standard that has been developed to define the control and integration of multimedia services in a core, packet-switched network. In particular, the IMS architecture defines a set of logical functions that use a signaling protocol known as the SIP to establish communication sessions in an IP network. A "session" may be, for example, a one-to-one voice call or a more complex interaction, such as a one-to-many conference call involving multimedia services. SIP may also be used to facilitate voice over IP (VOIP) services, in which voice is transported in IP data packets that are re-assembled and converted into an audio signal for the recipient. IMS may be characterized as a standardized way to connect IP devices and networks using SIP.

Referring now to FIG. 1, an exemplary communication network 100, in accordance with some embodiments of the present invention, includes an IMS network 110 that is coupled to packet switching network(s) 120, which may provide connectivity to the IMS network 110 for devices 10, 20, such as mobile terminals, WiFi-equipped computing devices, modems, and other devices. A device may connect to the IMS network 110 using any of a number of different interfaces, generally depending on the nature of the device. The devices 10, 20 may include IP devices that are capable of communicating via SIP. In particular, electronic device 20 may be a mobile terminal that includes a Web server thereon in accordance with some embodiments of the present invention.

The IMS network 110 in accordance with some embodiments of the present invention, includes apparatus configured to provide a variety of different functions linked by standardized interfaces. Generally, functions of the IMS network 110 include a bundle of functions of SIP servers or proxies, collectively referred to as a Call Session Control Function (CSCF) 130, which are used to process SIP signaling packets in the MS network 110. It will be appreciated that the CSCF 130 may be implemented as a single server, separate servers, or a network of servers either co-located in a server farm, for example, or located in different geographic regions. Functions of the CSCF 130 may include: registration of devices with the IMS network 110; routing and inspection of signaling messages; authentication of users and establishment of security associations; compression, decompression and other signal processing functions; authorization of resources; policy enforcement; bandwidth management; and generation of charging, records. It will be understood that, in accordance with some embodiments of the present invention, these functions may be apportioned among several call session control function proxies or servers, such as a Proxy-CSCF (P-CSCF) 140, Interrogating-CSCF (I-CSCF) 160, Serving-CSCF (S-CSCF) 150, and various other functions, gateways and the like.

The P-CSCF 140 may be configured as a SIP proxy to function as an interface to the IMS network 110 for IP terminals/devices 10, 20. The P-CSCF 140 may enable the registration of IP terminals/devices and the routing of SIP and/or HyperText Transfer Protocol (HTTP) signaling messages between the devices 10, 20 and service providers. The P-CSCF 140 may communicate with devices 10 via the packet network(s) 110 and may communicate with devices coupled to a circuit-switched network via a Media Gateway Control Function (not shown).

The S-CSCF 150 performs session control and communicates with a Home Subscriber Server (HSS) database 170, which maintains a service profile and other information for each end-user and associated IP terminal/device that has registered with the IMS network 110. The profile and other information may include, but is not limited to, IP address information, roaming information, and/or telephony services information. The S-CSCF 150 handles SIP registrations, which allows it to bind the IP address of an IP terminal with a SIP address. The S-CSCF 150 inspects all signaling messages and determines which application server(s) a SIP message should be routed to. The I-CSCF 160 defines the edge of an administrative domain. The IP address for the I-CSCF 160 is publicly accessible via DNS so that remote servers can find it and use it as an entry point for SIP packets/messages into this domain.

The various elements of the communication network 100 may be connected by a global network, such as the Internet or other publicly accessible network. Various elements of the network may be interconnected by a wide area network, a local area network, an Intranet, and/or other private network, which may not be accessible by the general public. Thus, the communication network 100 may represent a combination of public and private networks or a virtual private network (VPN). Although FIG. 1 illustrates an exemplary communication network, it will be understood that the present invention is not limited to such configurations, but is intended to encompass any configuration capable of carrying out the operations described herein.

Figure 2:
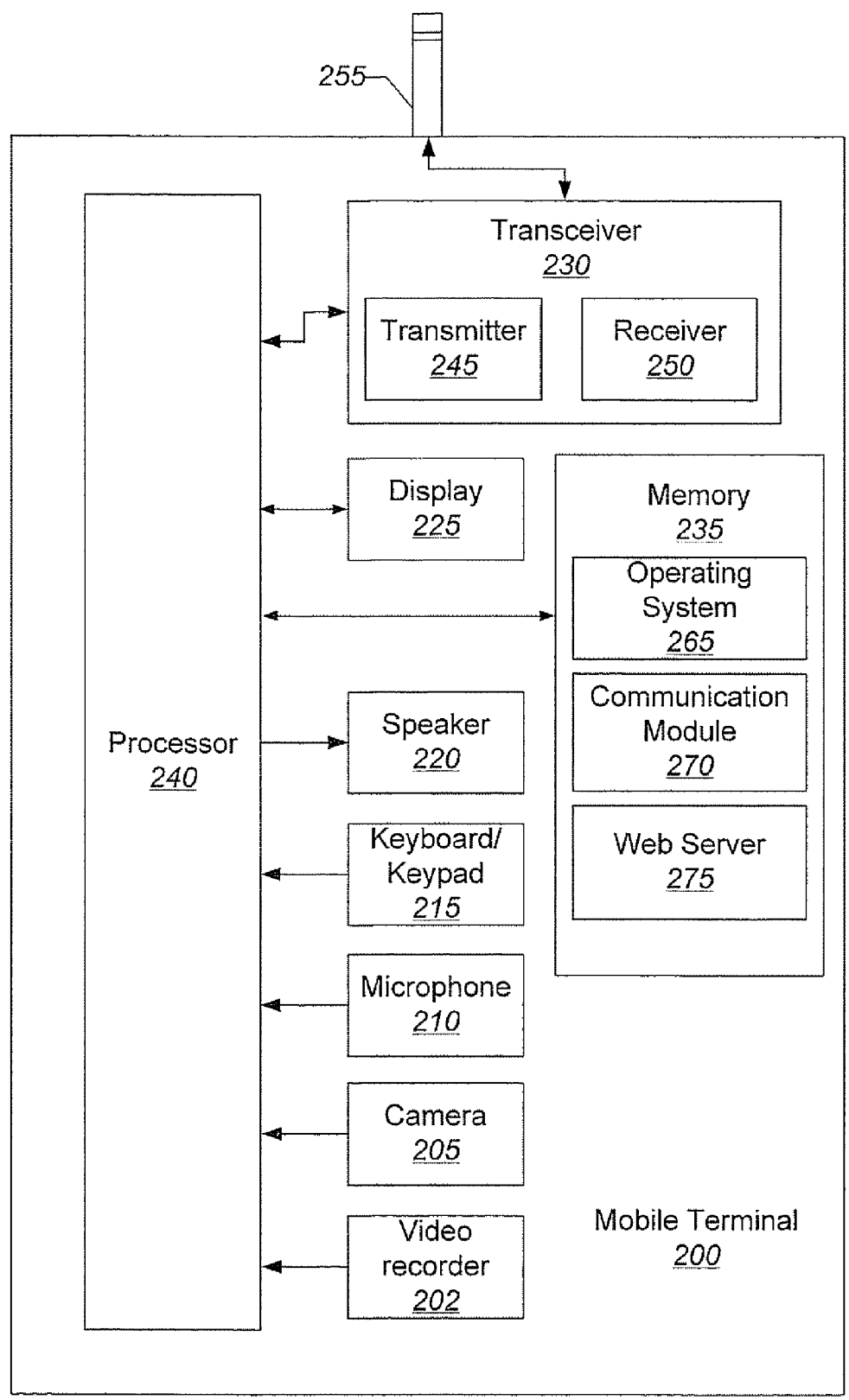
FIG. 2 is a block diagram that illustrates an electronic device/mobile terminal in accordance with some embodiments of the present invention.

Referring now to FIG. 2, an exemplary mobile terminal 200 that may be used to implement mobile terminal 20 of FIG. 1, in accordance with some embodiments of the present invention, includes a video recorder 202, a camera 205, a microphone 210, a keyboard/keypad 215, a speaker 220, a display 225, a transceiver 230, and a memory 235 that communicate with a processor 240. The transceiver 230 comprises a transmitter circuit 245 and a receiver circuit 250, which respectively transmit outgoing radio frequency signals to base station transceivers and receive incoming radio frequency signals from the base station transceivers via an antenna 255. The radio frequency signals transmitted between the mobile terminal 200 and the base station transceivers may comprise both traffic and control signals (e.g., paging signals/messages for incoming calls), which are used to establish and maintain communication with another party or destination. The radio frequency signals may also comprise packet data information, such as, for example, cellular digital packet data (CDPD) information. The foregoing components of the mobile terminal 200 may be included in many conventional mobile terminals and their functionality is generally known to those skilled in the art.

The processor 240 communicates with the memory 235 via an address/data bus. The processor 240 may be, for example, a commercially available or custom microprocessor. The memory 235 is representative of the one or more memory devices containing the software and data used to provide a phone-based Web server with a private IP address, in accordance with some embodiments of the present invention. The memory 235 may include, but is not limited to, the following types of devices. cache, ROM, PROM, EPROM, EEPROM, flash, SRAM, and DRAM.

As shown in FIG. 2, the memory 235 may contain up to three or more categories of software and/or data: the operating system 265, a communication module 270, and a Web server 275. The operating system 265 generally controls the operation of the mobile terminal 200. In particular, the operating system 265 may manage the mobile terminal's software and/or hardware resources and may coordinate execution of programs by the processor 240. The communication module 270 may be configured implement SIP functionality to allow the mobile terminal 200 to use SIP to establish communication sessions. Moreover, the communication module 270 may be configured to communicate with the IMS network 110 of FIG. 1 to register the mobile terminal 200 in the HISS 170, for example. The communication module 270 may further include an IP stack to carry out communications using IP. The Web server 375 may be configured to convey a Web service to a requesting device(s) responsive to request(s) received from devices that are forwarded through the Internet server with which the Web server 375 has registered. The Web server may provide a variety of Web services, such as, but not limited to, a blog, photo album, audio/video files for streaming or downloading, and the like.

As discussed above with respect to FIG. 1, IMS uses SIP to establish communication sessions between two endpoints, e.g., mobile terminals, computers, etc. SIP uses a protocol called Session Description Protocol (SDP) to convey the details of the description of the communication session to the participants. SDP provides a standard representation for describing communication session metadata to the participants. In general, SDP is used to convey sufficient information to enable an application to join a session and to announce the resources to be used to any non-participants that may have a need to know. According to some embodiments of the present invention, SDP may be used to negotiate "Web server" as a capability between a first device and a second device that includes a Web server thereon even though the second device has a private IP address.

Although FIG. 2 illustrates an exemplary software and hardware architecture that may be used to provide a phone-based Web server with a private IP address it will be understood that the present invention is not limited to such a configuration, but is intended to encompass any configuration capable of carrying out the operations described herein.

Computer program code for carrying out operations of devices and/or systems discussed above with respect to FIGS. 1-3 may be written in a high-level programming language, such as Java, C, and/or C++, for development convenience. In addition, computer program code for carrying out operations of embodiments of the present invention may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed digital signal processor or microcontroller.

The present invention is described hereinafter with reference to flowchart and/or block diagram illustrations of methods, mobile terminals, electronic devices, communication networks, and/or computer program products in accordance with some embodiments of the invention.

These flowchart and/or block diagrams further illustrate exemplary operations of discovering a phone-based Web server that has a private IP address, in accordance with some embodiments of the present invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Figure 3:
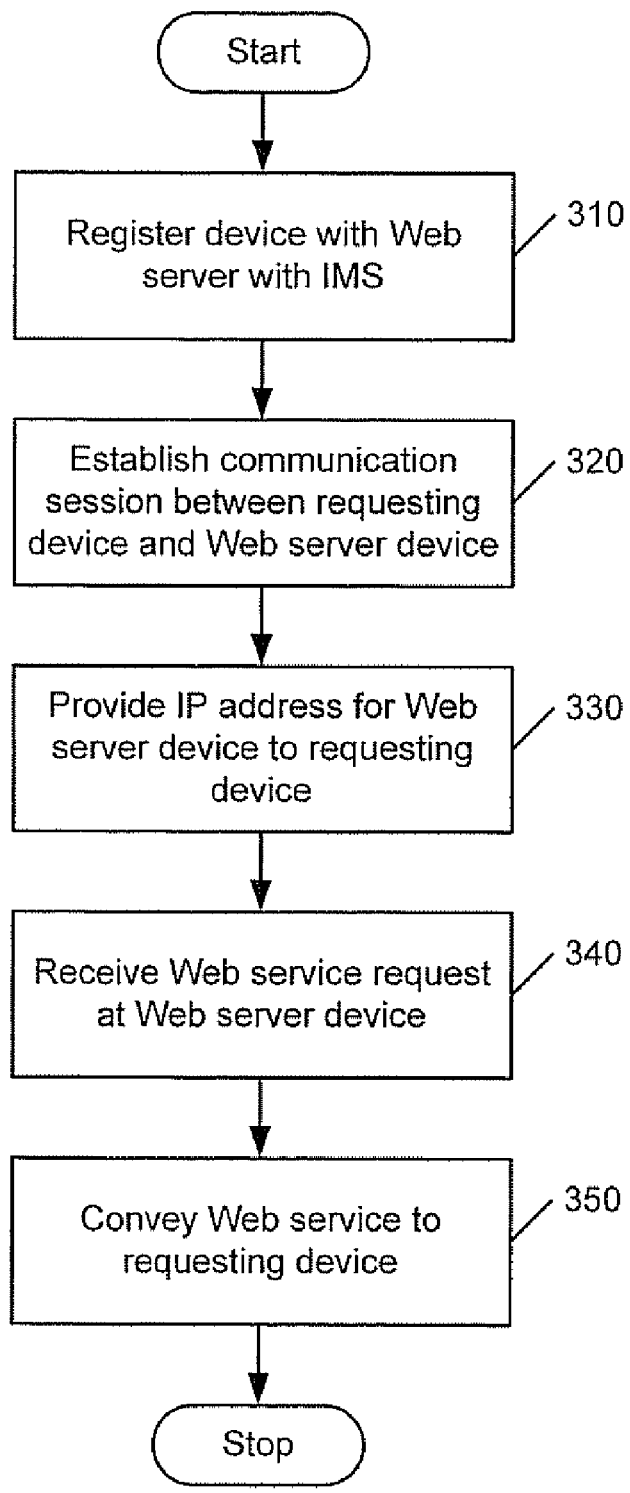
FIG. 3 is a flow chart that illustrates operations for operating an electronic device that has a private IP address to provide a Web service, in accordance with some embodiments of the present invention.

Referring now to FIG. 3 along with FIGS. 1 and 2, operations for operating an electronic device that has a private IP address to provide a Web service, in accordance with some embodiments of the present invention, begin at block 310 where mobile terminal 20 of FIG. 1 registers its profile with the HSS 170 of the IMS network 110. As discussed above, the profile may include a SIP address for the mobile terminal 20 for use by other devices in completing a SIP call to the mobile terminal 20. Moreover, the S-CSCF 150 may bind the IP address associated with the mobile terminal 20 with the SIP address of the mobile terminal 20.

At block 320, a device, such as device 10 of FIG. 1, may establish a communication session with the mobile terminal 20. This may be illustrated by way of example in which device 10 is associated with a user named Adam and the mobile terminal 20 is associated with a user named Bob. A SIP invite message may be sent from the device 10 to the mobile terminal 20 using SDP to negotiate the communication session as a connection to the Web server 275 (see FIG. 2) residing on the mobile terminal 20. For example, SDP includes a media description field denoted by "m=" having a format of m=<media><port><protocol><fmt>, where fmt stands for format description. To negotiate a "Web server" capability, the "media" subfield may be set to "application" and the format description subfield may be set to "HTTP" in accordance with some embodiments of the present invention. SDP also includes an attribute field denoted by "a=" having a format of a=<attribute>. In accordance with some embodiments of the present invention, the attribute field may be set to "web server." The attribute field may be used to clarify that HTTP is being used to communicate with a Web server to access a Web service as HTTP could be used for other types of services.

Thus, in particular embodiments of the present invention, the SIP invite message between device 10 ("Adam") and the mobile terminal 20 ("Bob") may be constructed as follows:

INVITE sip:bobgexample.com SIP/2.0
    Via: SIP/2.0/UDP 100.101.102.103:5060
    To: Bob<bob@example.com>
    From: Adam<adam@example.com>
    ...
    m=application 1234 TCP HTTP
    a=Web server Thus, at block 320 of FIG. 3 after exchanging SIP messages, a communication session may be established between device 10 and mobile terminal 20 in which a Web server capability has been negotiated using the session metadata description functionality provided by SDP.

At block 330, the IP address of the mobile terminal 20 may be provided to the device 10 through the IMS network 110 because S-CSCF bound the IP address of the mobile terminal 20 to the SIP address of the mobile terminal 20 during registration with the IMS network as discussed above. The device 10 may then use this IP address to generate Web service requests, e.g., requests for Web pages or other services from the Web server 275, which are received at the mobile terminal 20 at block 340. The Web server 275 may then convey the requested Web service to the device 10 at block 350 in response to the request(s).

In other embodiments of the present invention, additional security may be provided by using HTTPS (HTTP plus the Secure Socket Layer (SSL) protocol) as the format description subfield in the media description field "m=." If only authentication is desired and not a secure connection, then conventional SIP and/or HTTP authentication may be used.

The flowchart of FIG. 3 illustrate the architecture, functionality, and operations of embodiments of methods, electronic devices, communication networks and/or computer program products for discovering a phone-based Web server having a private IP address. In this regard, each block represents a module, segment, or portion of code, which comprises one or more executable instructions for implementing the specified logical function(s). It should also be noted that in other implementations, the function(s) noted in the blocks may occur out of the order noted in FIG. 3. For example, two blocks shown in succession may, in fact, be executed substantially concurrently or the blocks may sometimes be executed in the reverse order, depending on the functionality involved.

Many variations and modifications can be made to the embodiments without substantially departing from the principles of the present invention. All such variations and modifications are intended to be included herein within the scope of the present invention, as set forth in the following claims.

That which is claimed:

1. A method of operating an electronic device to provide a Web service, comprising:
    establishing a communication session between the electronic device and a requesting device using Session Initiation Protocol (SIP);
    negotiating the communication session as a connection to a Web server using the SIP;
    providing an Internet Protocol (IP) address for the electronic device to the requesting device using the SIP;
    receiving a request addressed to the electronic device using the IP address from the requesting device; and
    conveying the Web service to the requesting device responsive to receiving the request.

2. The method of claim 1, wherein establishing the communication session comprises establishing the communication session over an IP Multimedia Subsystem (IMS) network.

3. The method of claim 2, further comprising:
    registering a profile associated with the electronic device with a Home Subscriber Server (HSS) database in the IMS network, the profile comprising a SIP address for the electronic device for use in completing a SIP call from the requesting device to the electronic device.

4. The method of claim 1, further comprising:
    receiving a SIP invite message that comprises a Session Description Protocol (SDP) portion that indicates a request to access the Web service during the communication session.

5. The method of claim 4, wherein the SDP portion comprises a media description field (m=) that contains a media subfield set to application and a format subfield (fmt) set to HyperText Transfer Protocol (HTTP).

6. The method of claim 5, wherein the SDP portion further comprises an attribute field (a=) that contains a Web server attribute to indicate that HTTP is used to access the Web service.

7. The method of claim 1, wherein the electronic device is a mobile terminal.

8. A computer program product comprising computer-readable program code embodied on a computer-readable medium, the computer readable program code being configured to carry out the method of claim 1.

9. An electronic device, comprising:
    a Web server; and
    a communication module that is configured to establish a communication session between the electronic device and a requesting device using Session Initiation Protocol (SIP);
    to negotiate the communication session as a connection to the Web server using the SIP and to provide an Internet Protocol (IP) address for the electronic device to the requesting device using the SIP;
    wherein the Web server is configured to receive a request addressed to the electronic device using the IP address from the requesting device and to convey the Web service to the requesting device responsive to receiving the request.

10. The electronic device of claim 9, wherein the communication module is further configured to establish the communication session over an IP Multimedia Subsystem (IMS) network.

11. The electronic device of claim 10, wherein the communication module is further configured to register a profile associated with the electronic device with a Home Subscriber Server (HSS) database in the IMS network, the profile comprising a SIP address for the electronic device for use in completing a SIP call from the requesting device to the electronic device.

12. The electronic device of claim 9, wherein the communication module is further configured to receive a SIP invite message that comprises a Session Description Protocol (SDP) portion that indicates a request to access the Web service during the communication session.

13. The electronic device of claim 12, wherein the SDP portion comprises a media description field (m=) that contains a media subfield set to application and a format subfield (fmt) set to HyperText Transfer Protocol (HTTP).

14. The electronic device of claim 13, wherein the SDP portion further comprises an attribute field (a=) that contains a Web server attribute to indicate that HTTP is used to access the Web service.

15. The electronic device of claim 9, wherein the electronic device is a mobile terminal.

16. A method of operating a communication network, comprising:
- using Session Initiation Protocol (SIP) to notify a first electronic device that a second electronic device, which does not have a public Internet Protocol (IP) address, has a Web server;
- wherein using the SIP to notify the first electronic device that the second electronic device has the Web server comprises using SIP to provide an IP address for the second electronic device to the first electronic device; and
- wherein the second electronic device is a mobile terminal.

17. The method of claim 16, further comprising:
- sending a request for a Web service from the first electronic device to the Web server at the second electronic device using the IP address of the second electronic device; and
- conveying the Web service from the second electronic device to the first electronic device responsive to receive the request at the second electronic device.

18. The method of claim 17, wherein the communication network is an IP Multimedia Subsystem (IMS) network.

19. The method of claim 18, further comprising:
- registering a profile associated with the second electronic device with a Home Subscriber Server (HSS) database in the IMS network, the profile comprising a SIP address for the second electronic device for use in completing a SIP call from the first electronic device to the second electronic device.

* * * * *

UNITED STATES PATENT AND TRADEMARK OFFICE
CERTIFICATE OF CORRECTION

| | | |
|---|---|---|
| PATENT NO. | : 7,975,055 B2 | Page 1 of 1 |
| APPLICATION NO. | : 11/689814 | |
| DATED | : July 5, 2011 | |
| INVENTOR(S) | : Larsson | |

It is certified that error appears in the above-identified patent and that said Letters Patent is hereby corrected as shown below:

In the Patent:
Column 9, Line 4: Please correct "sip:bobgexample.com"
to read -- sip:bob@example.com --

Signed and Sealed this
Sixth Day of December, 2011

David J. Kappos
*Director of the United States Patent and Trademark Office*